(12) United States Patent
Kim

(10) Patent No.: US 8,718,604 B2
(45) Date of Patent: May 6, 2014

(54) METHOD AND APPARATUS FOR PROVIDING ALTERNATIVE TELEPHONY SERVICE, AND METHOD OF COMPUTING INVERSE CALL CHARGE USING THE SAME

(71) Applicant: KSEEK Co., Ltd., Daejeon (KR)

(72) Inventor: Young Real Kim, Daejeon (KR)

(73) Assignee: KSEEK Co., Ltd., Daejeon (KR)

( * ) Notice: Subject to any disclaimer, the term of this patent is extended or adjusted under 35 U.S.C. 154(b) by 0 days.

(21) Appl. No.: 13/683,038

(22) Filed: Nov. 21, 2012

(65) Prior Publication Data
US 2013/0137396 A1  May 30, 2013

(30) Foreign Application Priority Data

Nov. 30, 2011  (KR) .................. 10-2011-0126627

(51) Int. Cl.
*H04M 11/00* (2006.01)

(52) U.S. Cl.
USPC ........ 455/408; 455/445; 455/436; 455/414.1; 455/418; 705/34; 705/40; 379/114.02; 379/114.03; 379/114.05; 379/114.28; 379/32.01

(58) Field of Classification Search
USPC ............. 379/93.09, 93.14, 100.04, 100.06, 379/114.01, 114.06, 114.21, 114.28, 379/121.04, 130, 212.01, 221.04, 268, 379/32.01, 36, 114.27, 121.01, 133; 455/425.1, 127.4, 405, 414.1, 418, 455/432.3, 436, 445, 453, 466; 370/237, 370/238; 705/34, 40; 725/1–8
See application file for complete search history.

(56) References Cited

U.S. PATENT DOCUMENTS

| 6,907,031 | B1 * | 6/2005 | Ehlinger et al. | ............... 370/352 |
| 7,492,879 | B1 * | 2/2009 | Beene et al. | ............. 379/114.02 |
| 2003/0072302 | A1 | 4/2003 | Yakura | |
| 2004/0203761 | A1 * | 10/2004 | Baba et al. | ..................... 455/433 |

(Continued)

FOREIGN PATENT DOCUMENTS

| JP | 10-150501 | 6/1998 |
| JP | 2001-160866 | 6/2001 |

(Continued)

OTHER PUBLICATIONS

European Patent Office, Extended European Search Report of European Patent Application No. 12194274.2 (Mar. 6, 2013).

*Primary Examiner* — Quan M Hua
(74) *Attorney, Agent, or Firm* — Lexyoume IP Meister, PLLC

(57) ABSTRACT

Disclosed is a method and an apparatus for providing an alternative telephony service which automatically switches an originating call between a basic telephony network and an alternative telephony network, and a method of inducing a caller or a receiver to subscribe to a service having a cheaper call rate by notifying the caller or the receiver of an inverse call charge which can be reduced according to whether telephony communication is performed using a basic telephony or an alternative telephony. Accordingly, it is possible to automatically connect the telephony communication using the basic telephony or the alternative telephony according to a telephony communication condition of the receiver, and thus reduce inconvenience due to a direct control of the receiver and first select a telephony communication scheme having a cheap call rate. Further, it is possible to more actively save a telephony communication call charge by naturally recommending the subscription and the use of the alternative telephony service through the notification of the inverse call charge to a non-subscriber or a non-user of the alternative telephony service.

10 Claims, 13 Drawing Sheets

(56) References Cited

U.S. PATENT DOCUMENTS

| | | |
|---|---|---|
| 2004/0233840 A1* | 11/2004 | Bye .................................. 370/210 |
| 2004/0266426 A1* | 12/2004 | Marsh et al. ................. 455/426.2 |
| 2005/0021849 A1* | 1/2005 | Hipfinger ........................ 709/239 |
| 2005/0031108 A1* | 2/2005 | Eshun et al. ............... 379/201.12 |
| 2005/0278262 A1* | 12/2005 | Cheliotis et al. ............... 705/400 |
| 2008/0291932 A1* | 11/2008 | Mukherjee ..................... 370/410 |
| 2009/0197568 A1* | 8/2009 | Carpenter et al. ............. 455/406 |

FOREIGN PATENT DOCUMENTS

| | | |
|---|---|---|
| JP | 2002-198887 | 7/2002 |
| JP | 2004-201014 | 7/2004 |
| JP | 2005-026965 | 1/2005 |
| JP | 2005-045518 | 2/2005 |
| KR | 10-2001-0104460 A | 11/2001 |
| KR | 10-2002-0014372 A | 2/2002 |
| KR | 10-2003-0050045 A | 6/2003 |
| KR | 10-2010-0109023 A | 10/2010 |
| WO | 2005/112420 | 11/2005 |

* cited by examiner

FIG.7

Inverse call charge bill
Reduced charge (2011. 08)

Payer information
Name: Hong Gil Dong   Address: Daejeon   Phone number: 010-0000-0000

- Reduced call charge in landline
  070-xxxx-xxxx: 24,000 won (call time: 220 minutes)
  Local call in Landline: 10,000 won (call time: 100 minutes)
- Reduced call charge in mobile phone
  010-xxxx-xxxx: 34,000 won (call time: 310 minutes)
- Reduced call charge in international call
  +81-(call in Japan): 40,000 won (call time: 140 minutes)
- Total of reduced call charge: 108,000 won You have received the reduction in the call charges as shown above while using an Internet telephony communication service. We hope that you continue using our service.

FIG.8

Inverse call charge bill

Reduction contribution charge (2011. 08)

Counterpart information
Name: Kim Cheol Soo   Address: Daejeon   Phone number: 010-0000-0000

- Call charge contributing to reduction in landline
  070-xxxx-xxxx: 24,000 won (call time: 220 minutes)
  Local call in landline: 10,000 won (call time: 100 minutes)
- Call charge contributing to reduction in mobile phone
  010-xxxx-xxxx: 34,000 won (call time: 310 minutes)
- Call charge contributing to reduction in international call
  +81-(call in Japan): 40,000 won (call time: 140 minutes)
- Total of call charge contributing to reduction: 108,000 won All of your counterparts have received the reduction in the call charges as shown above while you receive a call by using an Internet telephony communication service.

FIG.9

Inverse call charge bill

Generated call charge (2011. 08)

Counterpart information
Name: Kim Cheol Soo   Address: Daejeon   Phone number: 010-0000-0000

- Generated charge generated in landline
  070-xxxx-xxxx: 34,000 won (call time: 320 minutes)
  Local call in landline: 18,000 won (call time: 180 minutes)
- Generated charge generated in mobile phone
  010-xxxx-xxxx: 324,000 won (call time: 210 minutes)
- Generated charge generated in mobile phone
  +81-(call in Japan): 40,000 won (call time: 140 minutes)
- Sum of call charges generated in counterparts: 124,000 won You can make a counterpart communicator save the above call charge if you subscribe to an Internet telephony communication service and maintain a reception state.

* Call us for new Internet telephony communication service: 070-0000-1111

FIG.11

Inverse call charge bill

Reduction exclusion charge (2011. 08)

Payer information
Name: Hong Gil Dong   Address: Daejeon   Phone number: 010-0000-0000

- Non-reduced call charge in landline
  070-xxxx-xxxx: 19,000 won (call time: 120 minutes)
  Local call in landline: 14,000 won (call time: 160 minutes)
- Non-reduced call charge in mobile phone
  010-xxxx-xxxx: 30,000 won (call time: 200 minutes)
- Non-reduced call charge in international call
  +81-(call in Japan): 40,000 won (call time: 140 minutes)
- Sum of non-reduced call charges: 103,000 won You can receive the above reduction in the inverse call charge
if you subscribe to an Internet telephony communication service.
* Call us for new Internet telephony communication service: 070-0000-1111

METHOD AND APPARATUS FOR PROVIDING ALTERNATIVE TELEPHONY SERVICE, AND METHOD OF COMPUTING INVERSE CALL CHARGE USING THE SAME

CROSS-REFERENCE TO RELATED APPLICATION

This application claims priority to and the benefit of Korean Patent Application No. 10-2011-0126627 filed in the Korean Intellectual Property Office on Nov. 30, 2011, the entire contents of which are incorporated herein by reference.

BACKGROUND OF THE INVENTION (a) Field of the Invention

The present invention relates to a method and an apparatus for providing an alternative telephony service by automatically switching an originating call between a basic telephony network and an alternative telephony network, and a method of computing an inverse call charge which can be reduced or should be additionally paid according to whether telephony communication is performed using a basic telephony or an alternative telephony.

(b) Description of the Related Art

Conventional telephony communication technologies are classified into a basic telephony for providing a telephony communication service using a telephone office, a telephone switching device, a telephone, and a telephone line connecting the telephone office, the telephone switching device, and the telephone, and an alternative telephony for providing a communication service using wired and wireless Internet connection. Various telephony communication relay technologies are being developed to use all of the basic telephony and the alternative telephony.

Such a conventional telephony communication relay technology has a disadvantage in that it is inefficient in switching a telephony communication mode since a system such as a keyphone and the like selects internal telephony communication or external telephony communication, or a PSTN-USB gateway selects an alternative telephony or a basic telephony when a PSTN network telephone is used by inputting particular identification symbols (a particular number, an asterisk (*), a sharp (#)).

Further, while a caller actively uses an alternative telephony service in order to receive a direct call charge reduction benefit since a conventional alternative telephony provides a free call and call charge reduction benefits to only the caller, a receiver is less inclined to use or utilize the alternative telephony service.

Since only the caller receives the benefit of a charge reduction, this causes the alternative telephony service not to be efficiently nor equally utilized between the caller and the receiver.

In order to solve the above problems, Korea Patent Registration Publication No. 10-0862750 discloses a telephone connection relay apparatus for performing a telephone connection between a caller and a receiver by selecting an alternative telephone and a telephone using a public telephone network/mobile communication network according to an attribute of a phone number.

Also, Korea Patent Registration Publication No. 10-0914164 discloses a telephone relay apparatus for saving a call charge, which determines whether a receiver side subscribes to an alternative telephony service (for example, SKYPE service) through an Internet network and provides free call and messaging functions using the Internet network according to a result of the determination.

However, the relay apparatuses fixedly select a telephony communication mode according to the attribute of the phone number and according to whether the receiver side subscribes to the Internet telephony communication service, so that it is still difficult to expect to automatically connect a call through any one communication line providing a cheap call rate.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of automatically performing a telephony communication connection of a basic telephony or an alternative telephony according to whether a receiver subscribes to an alternative telephony service or the receiver maintains an alternative telephony reception standby state.

The present invention also has been made in an effort to provide a method of inducing a receiver to perform switching to a cheaper telephony communication means by automatically notifying the receiver of an inverse call charge corresponding to a call charge relatively additionally paid by a caller due to the use of the basic telephony by the receiver instead of the alternative telephony.

An exemplary embodiment of the present invention provides a method of providing an alternative telephony service including: sending a call connection request including receiver information to an alternative telephony network through an alternative telephony communication module by a switching determination module of a telephony terminal of a caller; and when a notice for informing that a receiver is not an alternative telephony service subscriber or a notice for informing that the receiver is not in an alternative telephony reception standby state is received from the alternative telephony network, sending the call connection request to a basic telephony network through a basic telephony communication module by the switching determination module.

Another exemplary embodiment of the present invention provides an apparatus for providing an alternative telephony service including: a basic telephony communication module for supporting communication of a basic telephony network; an alternative telephony communication module for supporting communication of an alternative telephony network; an input module for receiving an input of information on a receiver who is a telephony communication counterpart, and generating a call connection request; and a switching determination module for sending the call connection request to the alternative telephony network through the alternative telephony communication module, and sending the call connection request to the basic telephony network through the basic telephony communication module when a notice for informing that a receiver is not an alternative telephony service subscriber or the receiver is not in an alternative telephony reception standby state is received from the alternative telephony network.

Yet another exemplary embodiment of the present invention provides a method of computing an inverse call charge including: sending a call connection request including information on a receiver to an alternative telephony communication module by a switching determination module of a telephony terminal of a caller; when the alternative telephony communication module receives a notice for informing that the receiver is not an alternative telephony service subscriber or the receiver is not in an alternative telephony reception standby state from an alternative telephony network, switching the call connection request to the basic telephony communication module by the switching determination module; and after telephony communication by a call connection is terminated, computing an inverse call charge corresponding to a difference value between an actual call charge generated due to actual telephony communication due to actual telephony communication and a virtual call charge which is generated if telephony communication would be performed using an alternative telephony or a basic telephony, by using a call time of the alternative telephony or the basic telephony, by a charge computing module.

Still another exemplary embodiment of the present invention provides a method of computing an inverse call charge by an inverse call charge server connected to a telephony terminal of a caller or a receiver through an Internet, the method including: receiving a telephony communication record from the telephony terminal of the caller or the receiver who has finished telephony communication, by a communication module; and computing the inverse call charge corresponding to a difference value between an actual call charge due to actual telephony communication and a virtual call charge which is generated if telephony communication would be performed using an alternative telephony or a basic telephony, by using a telephony communication record of a particular caller or a particular receiver for a predetermined duration, by an inverse call charge computing module.

Still yet another exemplary embodiment of the present invention provides a method of computing an inverse call charge of a telephony terminal of a caller, the method including: measuring a call time by operating a timer by a record module when telephony communication with a counterpart is initiated; and after the telephony communication is terminated, computing the inverse call charge corresponding to a difference value between an actual call charge due to actual telephony communication and a virtual call charge which is generated if the telephony communication would be performed using an alternative telephony or a basic telephony, by using the measured call time, by a charge computing module.

According to the present invention, it is possible to automatically connect the telephony communication using the basic telephony or the alternative telephony according to a telephony communication condition of the receiver, and thus reduce inconvenience due to a direct control of the receiver and first select a telephony communication scheme having a cheap call rate.

Further, according to the present invention, it is possible to more actively save a telephony communication call charge by naturally recommending the subscription and the use of the alternative telephony service through the notification of the inverse call charge to a non-subscriber or a non-user of the alternative telephony service.

BRIEF DESCRIPTION OF THE DRAWINGS

FIG. 7 to FIG. 10 illustrate various exemplary embodiments of an inverse call charge bill.

FIG. 11 illustrates an example of the reduction exclusion charge bill.

DETAILED DESCRIPTION OF THE EMBODIMENTS

Figure 1:
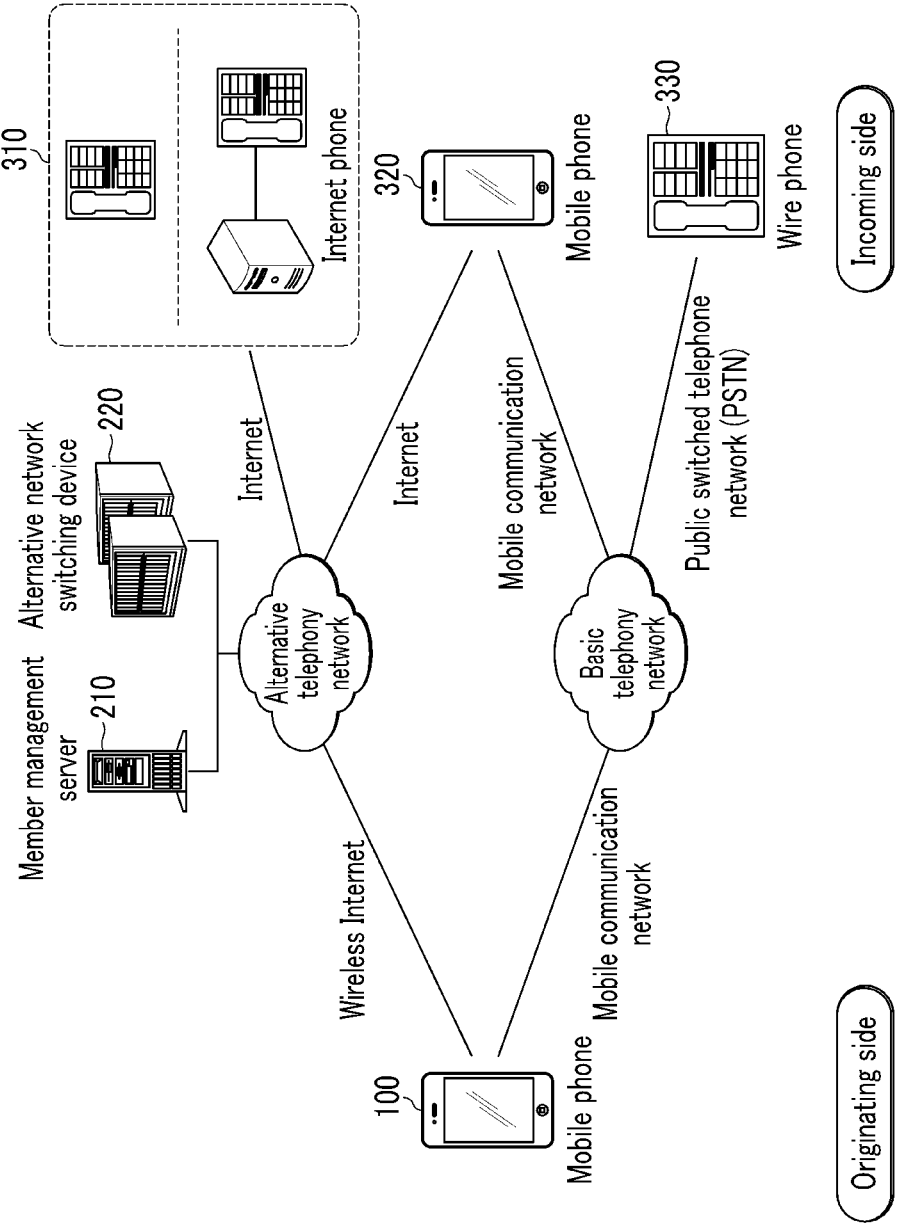
FIG. 1 schematically illustrates a configuration of a communication system which is a background of a first exemplary embodiment of the present invention.

Hereinafter, exemplary embodiments of the present invention will be described in detail with reference to the accompanying drawing. The drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

The "basic telephony" in the specification refers to a communication service in which telephony communication is connected between a caller and a receiver based on a phone number issued by a communication provider, and more particularly to a communication service having a structure in which a call originated through a wireless mobile communication network goes through a telephone switching device of a charged service provider located between the caller and the receiver and then is connected to the receiver via a public switched telephone network (PSTN) or the wireless mobile communication network.

The "alternative telephony" in the specification refers to a communication service in which telephony communication is connected between a caller and a receiver based on a phone number or other identification information (for example, an alternative telephony service membership ID, a resident registration number, an email address, a social network ID and the like), and more particularly to a communication service having a structure in which a call originated through a wired or wireless Internet goes through a switching means located between the caller and the receiver and then is connected to the receiver again through the Internet. It is assumed that "alternative telephony communication" is provided as a free service or provided at a relatively cheaper price than "basic telephony communication".

First Exemplary Embodiment

A first exemplary embodiment describes a method of switching an originating call to one of the alternative telephony or the basic telephony according to whether a receiver has subscribed to an alternative telephony service, and whether the receiver is in a state where telephony communication using the alternative telephony is available if the receiver has subscribed to the alternative telephony service when a caller calls by using a mobile phone, and a program implementing the method.

FIG. 1 schematically illustrates a configuration of a communication system which is a background of the first exemplary embodiment of the present invention.

It is based upon the premise in the first exemplary embodiment that an originating side performs the telephony communication by using a mobile phone 100 such as a smart phone, a tablet phone, a PDA phone, a Blackberry and the like. However, there are no restrictions on a telephony communication means of an incoming side. The incoming side can perform the telephony communication by using an Internet phone 310 or a mobile phone 320 through an alternative telephony network, and can perform the telephony communication by using the mobile phone 320 or a wire phone 330 through a basic telephony network. The Internet phone 310 may be connected to an Internet via a computer terminal or directly.

A mobile communication network in FIG. 1 refers to a second generation mobile communication network based on analog communication schemes such as CDMA, GSM and the like, or third and fourth mobile communication networks based on digital communication schemes such as WCDMA, CDMA 2000, HSDPA, Wibro, WiMAX, LTE and the like. Also, the mobile communication network can be construed as a communication network of a mobile communication service provided by a charged communication provider based on a phone number as well as the mobile communication networks based on the aforementioned mobile communication schemes. Although not illustrated in FIG. 1, a base station, a switching center and the like according to corresponding communication regulations can be arranged between the caller and the receiver in the mobile communication network in order to connect the caller and the receiver.

The alternative telephony network is connected with a member management server 210 for managing information on members having subscribed to the alternative telephony service and an alternative network switching device 220 for connecting telephony communication between the caller and the receiver. The member management server 210 and the alternative network switching device 220 are main components of an alternative telephony service provider system (not shown).

Figure 2:
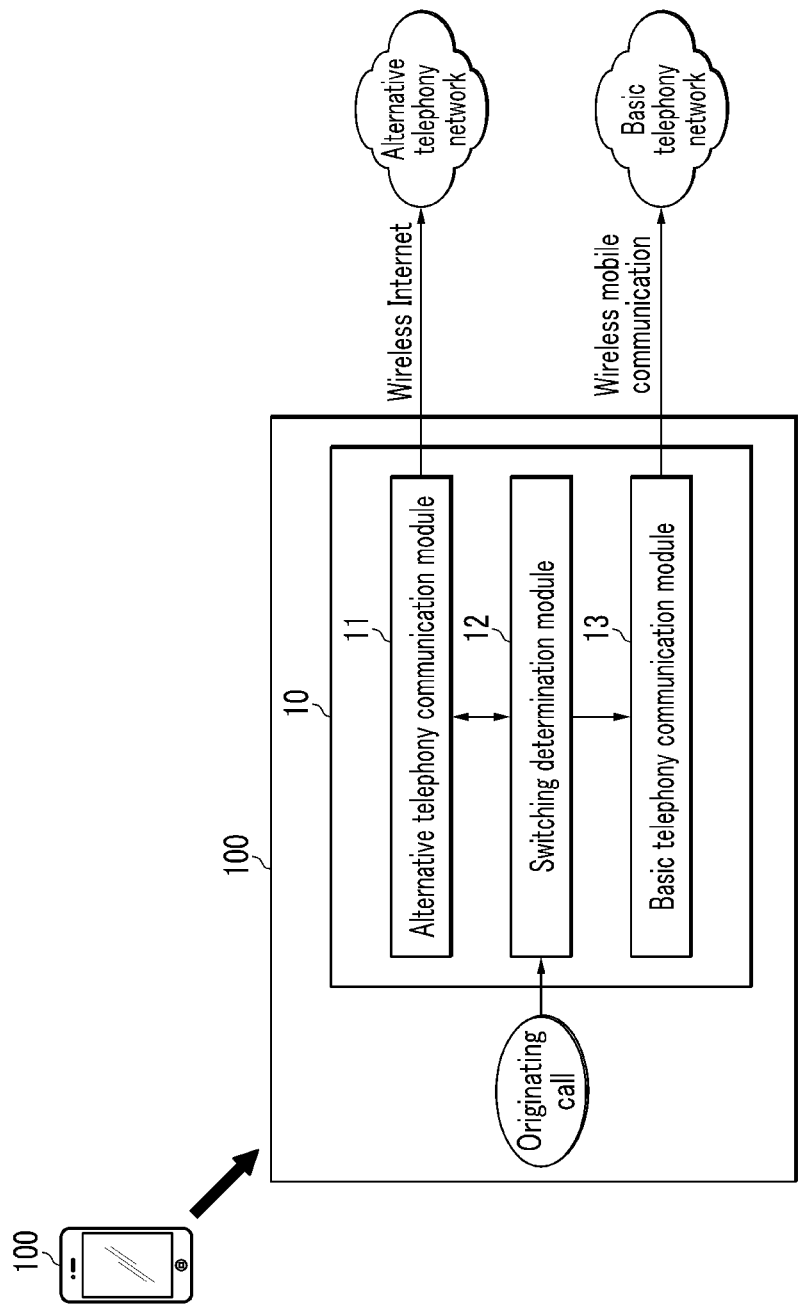
FIG. 2 is a block diagram illustrating each module of an originating call switching program executed in a mobile phone of an originating side for the first exemplary embodiment.

FIG. 2 is a block diagram illustrating each module of an originating call switching program 10 executed in a mobile phone of the originating side for the first exemplary embodiment.

When the caller presses a send button after selecting a receiver in a screen of the mobile phone or pressing a phone number in a keypad, an originating call including information on the selected receiver is input to a switching determination module 12. Here, the information on the receiver is an alternative telephony service ID of the receiver or a phone number of the receiver.

The switching determination module 12 primarily transmits a call connection request including the information on the receiver to the alternative telephony network through an alternative telephony communication module 11. Further, when the switching determination module 12 receives a notice for informing that the receiver is a non-subscriber of the alternative telephony service or a notice for informing that the receiver is not in an alternative telephony reception standby state from the alternative telephony network, the switching determination module 12 secondarily transmits the call connection request to the basic telephony network through a basic telephony communication module 13.

The alternative telephony communication module 11 and the basic telephony communication module 13 support a communication standard and a communication protocol to use the alternative telephony and the basic telephony, respectively. For example, in a case where the alternative telephony uses an Internet telephony service and the basic telephony uses a fourth generation mobile communication service, the alternative telephony communication module 11 supports WiFi for a wireless Internet, supports VoIP for voice data transmission, and supports TCP/IP for Internet communication. Further, the basic telephony communication module 13 supports LTE for wireless mobile communication.

Figure 3:
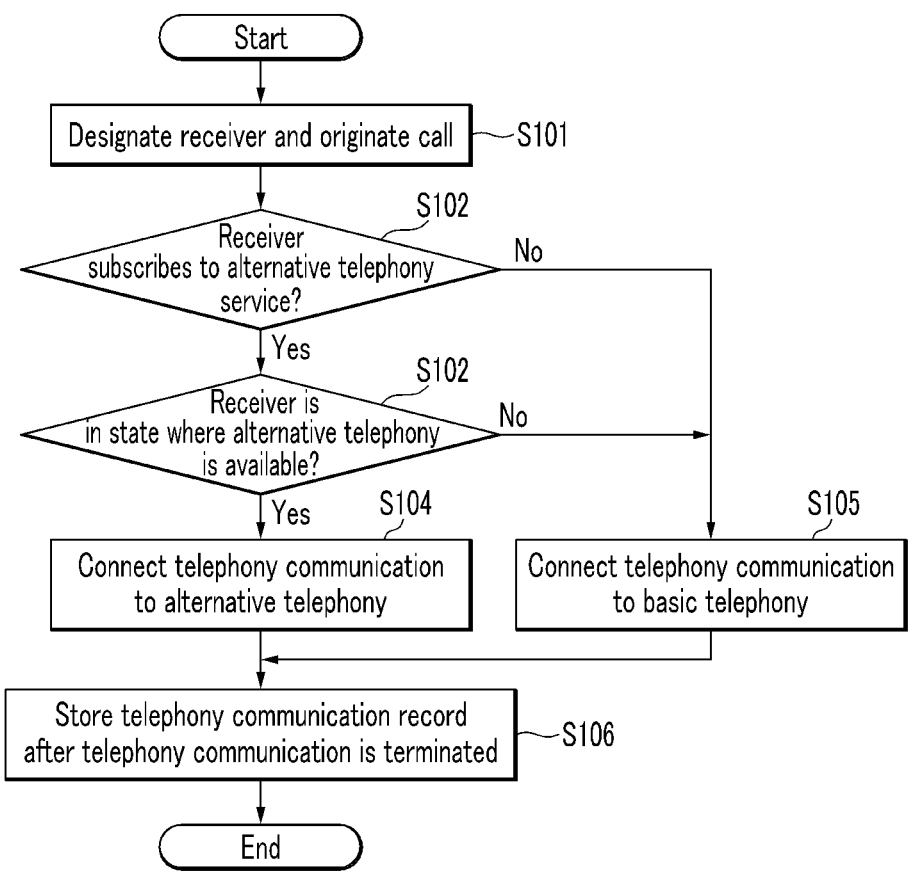
FIG. 3 is a flowchart sequentially illustrating a method of switching the originating call of the first exemplary embodiment.

FIG. 3 is a flowchart sequentially illustrating a method of switching the originating call of the first exemplary embodiment.

When the originating side calls by inputting a number keypad or specifying a receiver by selecting the receiver through a touch, the mobile phone 100 of the originating side primarily transmits a call connection request including information on the receiver to the alternative telephony network (step S101). The information on the receiver may be an alternative telephony service ID or a phone number of the receiver.

When the member management server 210 of the alternative telephony network receives the call connection request including the information on the receiver from the mobile phone 100 of the originating side, the member management server 210 searches a member database (not shown) to identify whether the receiver is an alternative telephony service subscriber (step S102).

Subsequently, when it is identified by the member management server 210 that the receiver is the alternative telephony service subscriber, the alternative network switching device 220 identifies whether a telephone of the receiver is in an alternative telephony reception standby state (step S103). When there is the call connection request from the originating side, the alternative network switching device 220 transmits a signal for identifying the state to the incoming side, and can grasp the alternative telephony reception standby state according to a received feedback signal.

For reference, in order to enable the incoming side to be in a normal alternative telephony reception standby state, 1) an Internet phone should be connected to an Internet and its power should be turned on, 2) a computer terminal connected to the Internet should be connected to the Internet phone and its power should be turned on, or 3) a mobile phone should maintain Internet communication and should be set to an alternative telephony receivable mode.

When it is determined that the corresponding receiver is the alternative telephony service subscriber and the telephone of the receiver is in the normal alternative telephony reception standby state, the alternative network switching device 220 connects telephony communication of the alternative telephony between the caller and the receiver (step S104).

On the other hand, when a notice for informing that the corresponding receiver is not the alternative telephony service subscriber or a notice for informing that the corresponding receiver is not in a communicable state through the alternative telephony arrives from the alternative telephony network, the mobile phone 100 of the originating side secondarily switches and transmits the call connection request to the basic telephony network (step S105).

When the telephony communication is performed through the alternative telephony network or the basic telephony network and then the telephony communication is terminated, a record of the corresponding telephony communication can be stored in a memory (no shown) (step S106).

Second Exemplary Embodiment

A second exemplary embodiment describes a method of switching an originating call to one of the alternative telephony or the basic telephony according to whether a receiver has subscribed to the alternative telephony service, or whether the receiver is in a state where telephony communication using the alternative telephony is available if the receiver has subscribed to the alternative telephony service when a caller calls by using an Internet phone, and a program for implementing the method.

Figure 4:
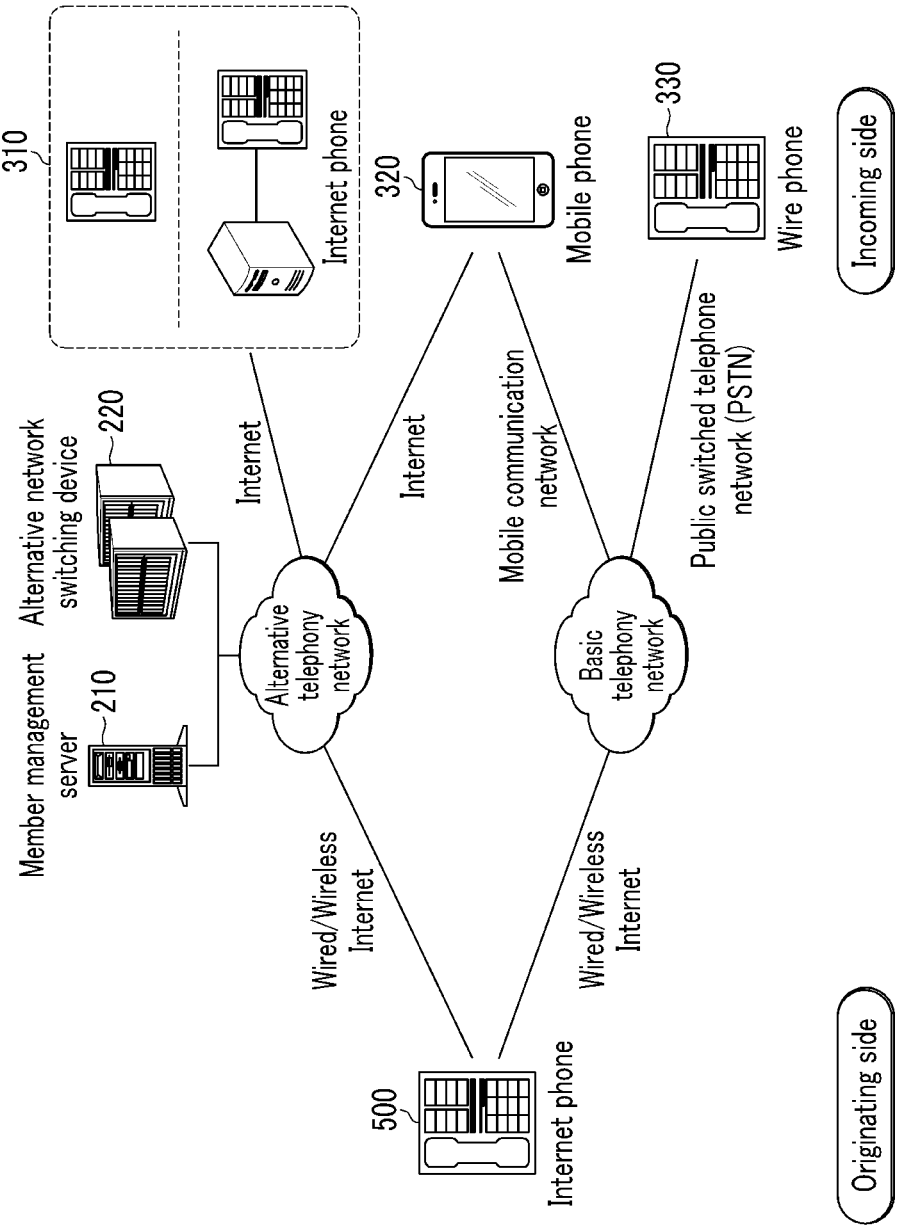
FIG. 4 schematically illustrates a configuration of a communication system which is a background of a second exemplary embodiment.

FIG. 4 schematically illustrates a configuration of a communication system which is a background of the second exemplary embodiment.

The second exemplary embodiment is based upon the premise that the originating side uses an Internet telephony terminal 500 performing telephony communication through a wired or wireless Internet. The originating side can perform telephony communication through the basic telephony network based on a phone number (for example, starting with "070" in Korea and starting with "050" in Japan, and there may be different number systems for respective nations) allocated by a communication provider of the basic telephony network, or can perform communication through the alternative telephony network based on the phone number or a membership ID. However, there is only difference from the first exemplary embodiment in that both the basic telephony network and the alternative telephony network are physically based on the Internet. In this case, the basic telephony network and the alternative telephony network can be distinguished by differences of a routing path (IP address and the like), a communication service protocol and the like for a communication service. Meanwhile, like the first embodiment, there are no restrictions on a telephony communication means of the incoming side.

Since a member management server 210 and an alternative network switching device 220 of the alternative telephony network in FIG. 4 are equal to the member management server 210 and the alternative network switching device 220 of the first exemplary embodiment, repeated descriptions will be omitted.

Figure 5:
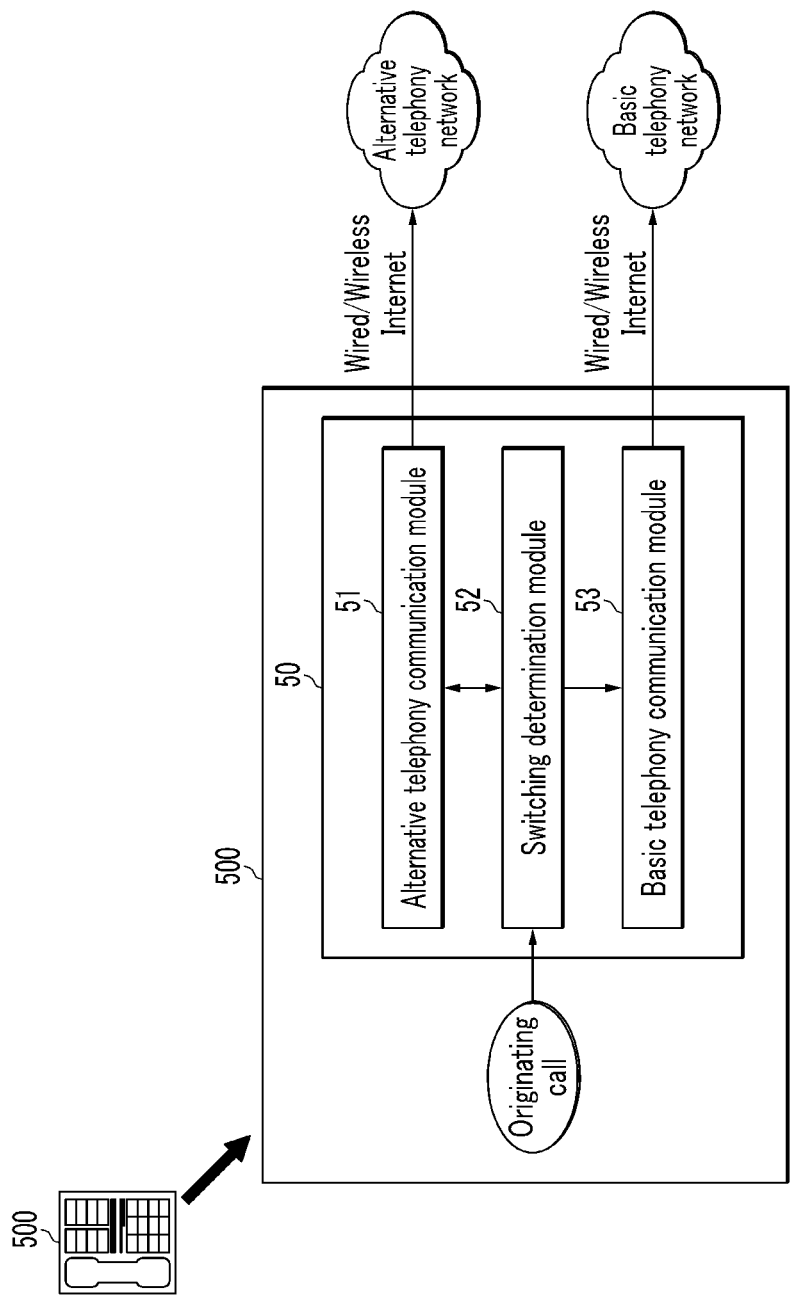
FIG. 5 is a block diagram illustrating each module of an originating call switching program executed in an Internet telephony terminal of an originating side for the second exemplary embodiment.

FIG. 5 is a block diagram illustrating each module of an originating call switching program 50 executed in the Internet telephony terminal of the originating side for the second exemplary embodiment.

In FIG. 5, a switching determination module 52 performs the same role and the same function as those of the switching determination module 12 in the first exemplary embodiment. However, an alternative telephony communication module 51 performs the same role as that of the alternative telephony communication module 11 in the first exemplary embodiment, but has a difference in an aspect of the function in that the alternative telephony communication module 51 supports at least one of a wireless Internet telephony and a wire Internet telephony in comparison with the alternative telephony communication module 11 in the first exemplary embodiment supporting only the wireless Internet telephony. Further, a basic telephony communication module 53 performs the same role as that of the basic telephony communication module 13 of the first exemplary embodiment, but has a difference in an aspect of the function in that the basic telephony communication module 53 supports at least one of a wireless Internet telephony and a wire Internet telephony in comparison with the basic telephony communication module 13 of the first exemplary embodiment supporting a mobile communication telephony.

Accordingly, repeated descriptions will be omitted since the method of switching the originating call in the second exemplary embodiment and the method of switching the originating call in the first exemplary embodiment have the same basic process and only a difference in applied communication protocols.

Third Exemplary Embodiment

A third exemplary embodiment and a fourth exemplary embodiment which will be discussed below describe a method of inducing a receiver to subscribe to the alternative telephony service or to remain in an alternative telephony communicable state all the time by notifying the receiver of an automatically computed "inverse call charge" corresponding to a call charge which is should be relatively additionally paid by the caller or the receiver due to the telephony communication avoidably using the basic telephony because although the caller desired to perform the communication through the alternative telephony having a cheap call rate, the receiver is not an alternative telephony service subscriber or is not in a normal alternative telephony reception standby state, and a program for implementing the method.

Further, the third exemplary embodiment particularly describes a case in which a method and a program for computing the inverse call charge are implemented in a telephony terminal of the caller.

Figure 6:
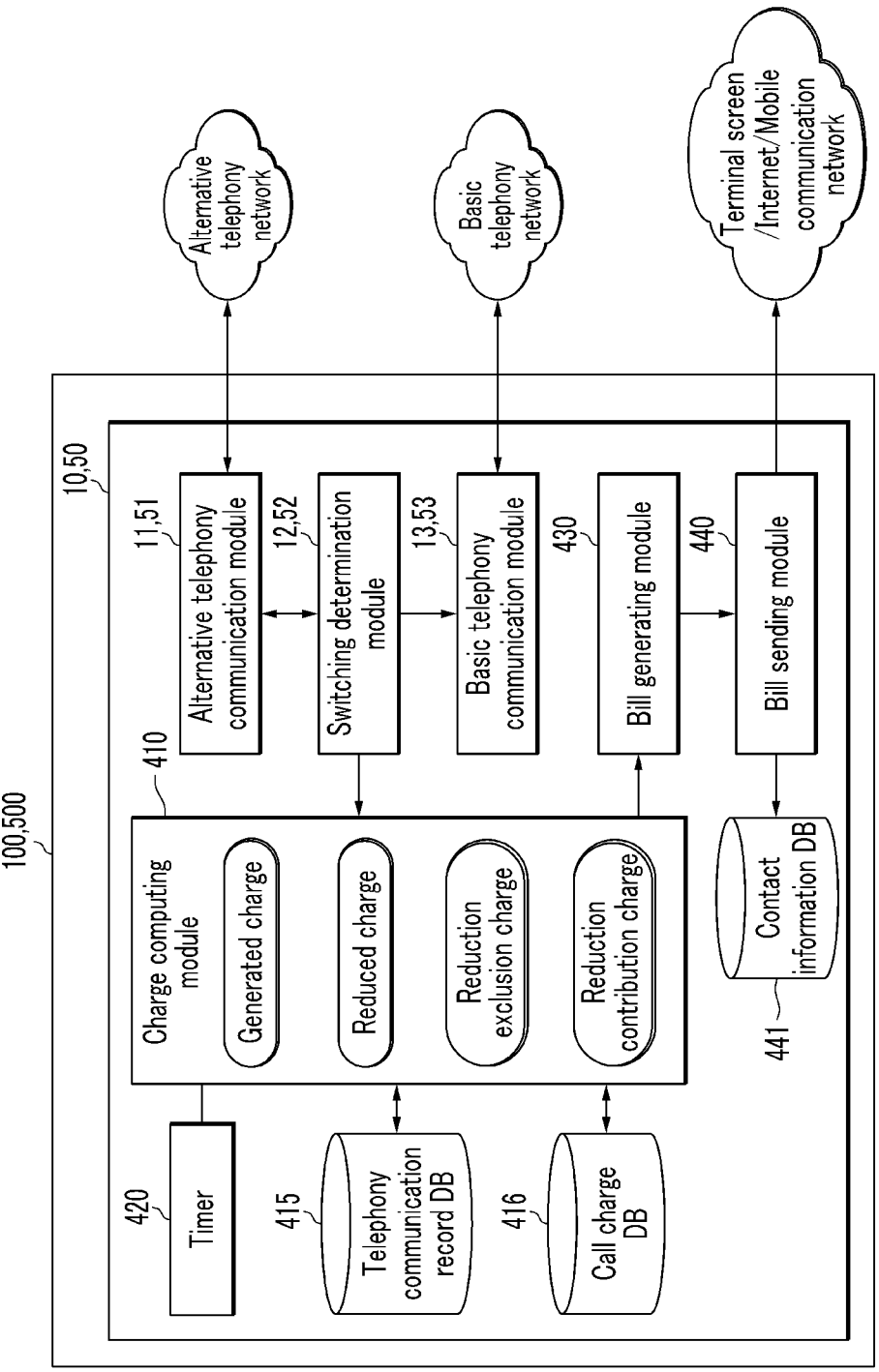
FIG. 6 is a block diagram illustrating each module of a configuration of an "inverse call charge" computing program executed in a phone terminal of the caller for a third exemplary embodiment.

FIG. 6 is a block diagram illustrating a configuration of an "inverse call charge" computing program, for each module, executed in phone terminals 100 and 500 of the caller for the third exemplary embodiment.

The "inverse call charge" computing program of FIG. 6 includes the alternative telephony communication module 11 or 51, the switching determination modules 12 and 52, the basic telephony communication module 13 or 53, a charge computing module 410, a timer 420, a telephony communication record DB 415, and a call charge DB 416, and may further include a bill generating module 430, a bill sending module 440, and a contact information DB 441. At least one of the telephony communication record DB 415, the call charge DB 416, and the contact information DB 441 may be stored in a memory (not shown) of the telephony terminal 100 or 500 of the caller, or stored in a separate external database server (not shown) connected through the Internet or the mobile communication network.

i) When the telephony communication is performed using the alternative telephony, and ii) when the telephony communication is performed using the basic telephony instead because it is difficult to perform the telephony communication through the alternative telephony, "telephony communication information" containing caller information, a caller telephony type, a receiver information, and a receiver telephony communication type of the corresponding telephony communication is transmitted to the switching determination modules 12 and 52. The caller information is an alternative telephony service ID of the caller or a phone number of the caller, and the caller telephony type designates the alternative telephony or the basic telephony. Further, the receiver information is an alternative telephony service ID of the receiver or a phone number of the receiver, and the receiver telephony communication type designates the alternative telephony or the basic telephony.

The charge computing module 410 computes at least one of a "reduced charge", a "reduction contribution charge", a "reduction exclusion charge", and a "generated charge" when a preset due dateDeletedTextsor period arrives, or a direct instruction is provided by a user.

The "reduced charge" refers to a relatively reduced charge in comparison with a basic telephony call charge due to telephony communication between a particular caller and a counterpart communicator through the alternative telephony. In this case, the counterpart communicator may be one or more receivers (meaning that it reminds justifiability of the alternative telephony service subscription).

Further, the "reduction contribution charge" refers to a charge contributing to reduce the call charge paid by a counterpart communicator in comparison with the basic telephony call charge due to the telephony communication between a particular receiver and the counterpart communicator through the alternative telephony. In this case, the counterpart communicator may be one or more counterpart callers (meaning that it reminds to faithfully maintain an alternative telephony reception standby state continuously in the future).

Moreover, the "reduction exclusion charge" refers to a charge paid more in comparison with the alternative telephony call charge due to the telephony communication between a particular caller who has not subscribed to the alternative telephony service and a counterpart communicator who remains in a reception state through the basic telephony. In this case, the counterpart communicator may be one or more receivers (meaning that it induces the caller to subscribe to the alternative telephony service).

Lastly, the "generated charge" refers to a charge paid more by a counterpart communicator in comparison with the alternative telephony call charge due to the telephony communication between a particular receiver who does not remain in the alternative telephony reception standby state and the counterpart communicator who uses the alternative telephony through the basic telephony. In this case, the counterpart communicator may be one or more callers (meaning that it induces the particular receiver to subscribe to the alternative telephony service or reminds to faithfully maintain the alternative telephony reception standby state).

Describing the charge computing module 410 in more detail, the charge computing module 410 receives telephony communication information from the switching determination module 12. When the charge computing module 410 detects that the corresponding telephony communication is initiated, the charge computing module 410 operates the timer 420 to check a call time, and stores the received telephony communication information in the telephony communication record DB 415. Then, when a charge computing date pre-stored in a memory (not shown) arrives or a user's instruction is input, the charge computing module 410 computes at least one of the "reduced charge", the "reduction contribution charge", the "reduction exclusion charge", and the "generated charge" according to a preset policy or the user's instruction.

Specifically, the charge computing module 410 reads a telephony communication record of a predetermined duration from the telephony communication record DB 415 and reads unit charges of the "alternative telephony" and the "basic telephony for each telephony communication type" from the call charge DB 416 in order to compute the "reduced charge". Then, the charge computing module 410 multiplies the unit charge of the alternative telephony and the call time for cases of the alternative telephony among the telephony communication record and then adds the multiplied results, and multiplies a corresponding unit charge for each telephony communication type of the receiver and the call time for cases of the basic telephony among the telephony communication record and then adds the multiplied results. Furthermore, the charge computing module 410 can further compute a total call charge of the predetermined duration by adding the added alternative call charge and basic call charge.

Subsequently, the charge computing module 410 multiplies the unit charge of the "basic telephony for each telephony communication type" and the call time of each case in the telephony communication record of the predetermined duration and computes a call charge before the reduction for each telephony communication type of the receiver. Further, it is possible to compute a total call charge of the predetermined duration corresponding to a charge before the reduction by adding all of the computed call charges for respective types. Further, the reduced cost through the use of the alternative telephony can be more specifically computed for each subtotal and/or in an aspect of the total call charge by comparing the actually generated call charge with the virtual call charge generated based on an assumption that the basic telephony is used.

The bill generating module 430 generates a reduced charge bill by receiving the computed actual call charge and virtual call charge before the reduction, or a difference value between them from the charge computing module 410, and applying the actual and virtual call charges and the difference value to a predetermined template.

FIG. 7 illustrates an example of the reduced charge bill.

As shown in FIG. 7, the reduced charge bill can indicate a caller item and a reduced charge item specifying information on a charge to be reduced through the use of the alternative telephony. Specifically, the caller item indicates at least one of a name, an address, and a phone number of the caller, and the reduced charge item can indicate both an actual call charge generated by the use of the alternative telephony for each telephony communication type (a landline telephony, a mobile telephony, a long-distance telephony, an international telephony, etc.) of the receiver and a charge which should be additionally paid if the alternative telephony is not used, or indicate a charge relatively reduced due to the use of the alternative telephony as shown in FIG. 8.

A user can clearly recognize the reduced charge due to the use of the alternative telephony through receiving the reduced charge bill, so that the user is more likely to continuously use the alternative telephony service in the future.

Next, in order to compute the "reduction contribution charge", the charge computing module 410 reads a telephony communication record of a predetermined duration of a particular receiver from the telephony communication record DB 415, and reads the unit charges of the "alternative telephony" and the "basic telephony for each telephony communication type" from the call charge DB 416. Then, the charge computing module 410 multiplies the unit charge of the alternative telephony and the call time for cases of the alternative telephony among the telephony communication record and then adds the multiplied results, and multiplies a corresponding unit charge for each telephony communication type of the receiver and the call time for cases of the basic telephony among the telephony communication record and then adds the multiplied results. Furthermore, it is possible to further compute a total call charge of the predetermined duration by adding the added alternative call charge and basic call charge.

Subsequently, the charge computing module 410 multiplies the unit charge of the "basic telephony for each telephony communication type" and the call time of each case in the telephony communication record of the predetermined duration and computes a call charge before the reduction for each telephony communication type of the receiver. Further, the charge computing module 410 can further compute a total call charge of the predetermined duration corresponding to a charge before the reduction by adding all of the computed call charges for respective types. Further, the reduced charge due to the use of the alternative telephony can be more specifically computed for each subtotal and/or in an aspect of the total call charge by comparing the actually generated call charge with the virtual call charge generated based on an assumption that the basic telephony is used.

The bill generating module 430 generates a reduction contribution charge bill by receiving the computed actual call charge and virtual call charge before the reduction, or a difference value between them from the charge computing module 410, and applying the actual and virtual call charges and the difference value to a predetermined template.

FIG. 8 illustrates an example of the reduction contribution charge bill.

As shown in FIG. 8, the reduction contribution charge bill can indicate a receiver item and a reduction contribution charge item specifying information on a charge to be reduced through the use of the alternative telephony. Specifically, the receiver item indicates at least one of a name, an address, and a phone number of the receiver, and the reduction contribution charge item can indicate both an actual call charge generated by the use of the alternative telephony for each telephony communication type (a landline telephony, a mobile telephony, a long-distance telephony, an international telephony, etc.) of the receiver and a charge which should be additionally paid if the alternative telephony is not used, or indicate a charge relatively contributing to the reduction of the caller due to the use of the alternative telephony.

Through receiving the reduction contribution charge bill, the receiver can clearly recognize a degree of the reduction of the call charge of the counterpart by faithfully maintaining the alternative telephony reception standby state. Accordingly, the receiver determines to faithfully maintain the alternative telephony reception standby state while continuously maintaining the subscription of the alternative telephony service.

Next, in order to compute the "generated charge", the charge computing module 410 reads a telephony communication record of a predetermined duration of a particular receiver from the telephony communication record DB 415, and reads the unit charges of the "alternative telephony" and the "basic telephony for each telephony communication type" from the call charge DB 416. Then, the charge computing module 410 multiplies the unit charge of the alternative telephony and the call time for cases of the alternative telephony among the telephony communication record and then adds the multiplied results, and multiplies a corresponding unit charge for each telephony communication type of the receiver and the call time for cases of the basic telephony among the telephony communication record and then adds the multiplied results. Furthermore, it is possible to further compute a total call charge of the predetermined duration by adding the added alternative call charge and basic call charge.

Subsequently, the charge computing module 410 computes a call charge which corresponds to a reduced charge, for each telephony communication type of the receiver, by multiplying the unit charge of the "alternative telephony" and the call time of each case in the telephony communication record for the predetermined duration. Further, it is possible to compute a total reduced call charge for the predetermined duration by adding all of the computed call charges for respective types.

Further, an additionally generated cost due to the use of the basic telephony can be more specifically computed for each subtotal and/or in an aspect of the total call charge by comparing the actually generated call charge with the virtual call charge generated based on an assumption that the alternative telephony is used.

The bill generating module 430 generates a generated charge bill by receiving the computed actual call charge and virtual call charge including the reduction, or a difference value between them from the charge computing module 410, and applying the actual and virtual call charges and the difference value to a predetermined template.

FIG. 9 illustrates an example of the generated charge bill.

As shown in FIG. 9, the generated charge bill can indicate a receiver item and a generated charge item specifying charge information additionally generated due to basic telephony communication. Specifically, the receiver item may indicate at least one of a name, an address, and a phone number of the receiver, and the generated charge item may indicate both an actual call charge generated by the use of the basic telephony for each telephony communication type (a landline telephony, a mobile telephony, a long-distance telephony, an international telephony and the like) of the receiver and a charge paid by the caller which can be reduced if the receiver uses the alternative telephony, or indicate a charge relatively additionally paid by the caller due to the use of the basic telephony.

Through receiving such a generated charge bill, a user can recognize how much a counterpart receives a cost reduction benefit if the user subscribes to the alternative telephony service. Accordingly, it is possible to induce the user to subscribe to the alternative telephony service or induce the user to maintain the reception state when the user has already subscribed to the alternative telephony service.

Next, a process of storing a received telephony communication record will be described before computing a charge since the "reduction exclusion charge" is generated when the receiver receives a call from the counterpart caller through the basic telephony network from a view point of the receiver.

Figure 10:
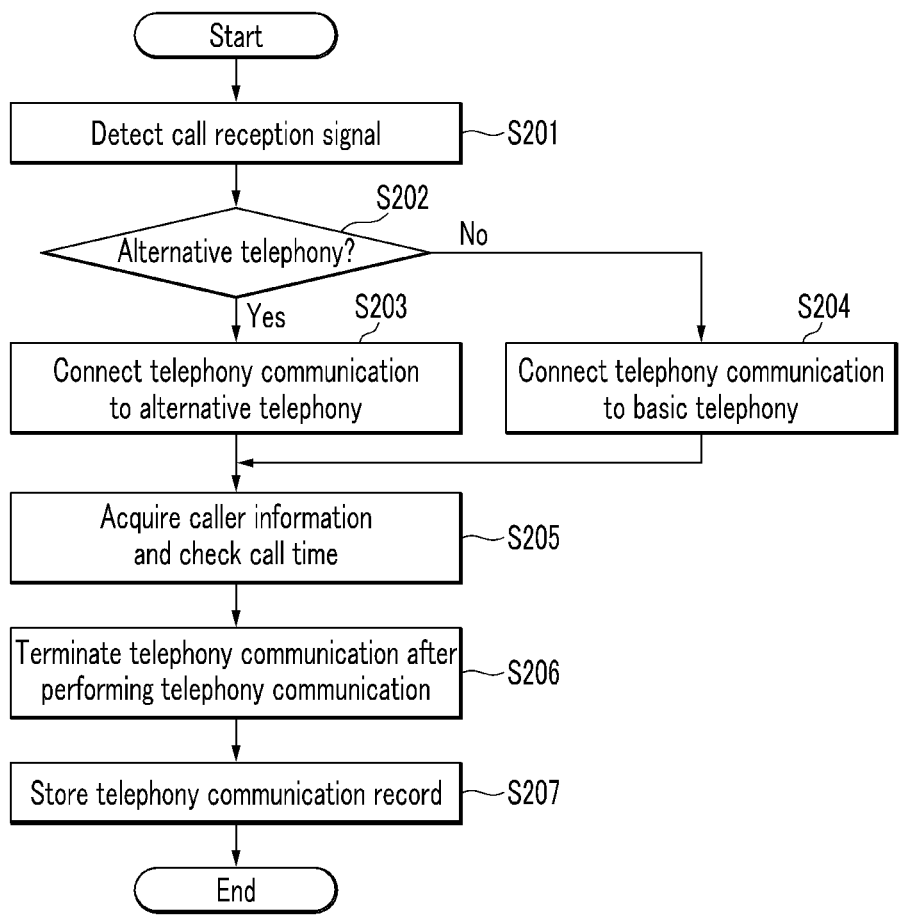

FIG. 10 sequentially illustrates a process of storing a telephony communication record to compute the reduction exclusion charge.

When a reception signal of a call from the counterpart caller is detected (step S201), the telephony communication is connected by using the alternative telephone (step S203) if the reception signal is the alternative telephony (step S202), and the telephony communication is connected by using the basic telephony if the reception signal is the basic telephony (step S204). When the telephony communication is connected, caller information (for example, caller's phone number provided as a caller ID) is acquired from the reception signal, and a call time is checked through the timer (step S205). After the telephony communication, a call time when the telephony communication is terminated and the caller information are stored together as the telephony communication record (step S206).

Describing the process of computing the reduction exclusion charge based on an assumption that there is such a preprocessing process, the charge computing module 410 reads a telephony communication record of a predetermined duration for a particular caller from the telephony communication record DB 415, and reads unit charges of the "alternative telephony" and the "basic telephony for each telephony communication type" from the call charge DB 416. Then, the charge computing module 410 multiplies the unit charge of the alternative telephony and the call time for cases of the alternative telephony among the telephony communication record and then adds the multiplied results, and multiplies a corresponding unit charge for each telephony communication type of the receiver and the call time for cases of the basic telephony among the telephony communication record and then adds the multiplied results. Furthermore, it is possible to further compute a total call charge of the predetermined duration by adding the added alternative call charge and basic call charge.

Subsequently, the charge computing module 410 computes a call charge which corresponds to a reduced charge, for each telephony communication type of the receiver by multiplying the unit charge of the "alternative telephony" and the call time of each case in the telephony communication record for the predetermined duration. Further, it is possible to compute a total reduced call charge for the predetermined duration by adding all of the computed call charges for respective types. Further, an additionally generated cost due to the use of the basic telephony can be more specifically computed for each subtotal and/or in an aspect of the total call charge by comparing the actually generated call charge with the virtual call charge generated based on an assumption that the alternative telephony is used.

The bill generating module 430 generates a reduction exclusion charge bill by receiving the computed actual call charge and virtual call charge including the reduction, or a difference value between them from the charge computing module 410, and applying the actual and virtual call charges and the difference value to a predetermined template.

FIG. 11 illustrates an example of the reduction exclusion charge bill.

As shown in FIG. 11, the reduction exclusion charge bill can indicate a caller item and a reduction exclusion charge item specifying charge information which should be additionally paid due to basic telephony communication. Specifically, the caller item may indicate at least one of a name, an address, and a phone number of the caller, and the reduction exclusion charge item may indicate both an actual call charge generated by the use of the basic telephony for each telephony communication type (a landline telephony, a mobile telephony, a long-distance telephony, an international telephony and the like) of the receiver and a charge paid by the caller which can be reduced if the caller uses the alternative telephony, or indicate a charge relatively additionally paid by the caller due to the use of the basic telephony.

Through receiving the reduction exclusion charge bill, a user can clearly identify a degree of the call charge to be reduced in the future by subscribing to the alternative telephony service. Accordingly, it is expected that the user actively considers subscribing to the alternative telephony service.

Lastly, the bill sending module 440 sends the charge bill generated by the bill generating module 430 to a caller or a particular receiver through one of a screen output on a telephony terminal, an e-mail, a messaging service (SMS, MMS, messenger and the like), and a web post according to a call charge bill type. Specifically, the reduced charge bill and the reduction exclusion charge bill are sent to the caller, and the reduction contribution charge bill and the generated charge bill are sent to the particular receiver.

Here, the receiver to receive the bills may be predetermined by a user or specified to a target suitable for a preset condition. To this end, the contact information DB 441 stores at least one URL of an e-mail address, a mobile phone number, a blog/social network service (SNS)/homepage and the like of the caller or the receiver to receive the bill, and may further store various information (for example, a customer rating, Internet utilization tendency, a circuit scale, a transaction scale, and the like) which can be used as a sending condition of other bills.

The bill generating module 430 can transmit print data for an output of a written bill for mail delivery to a predetermined printer (not shown) or transmit data for a digital medium record to a predetermined digital medium recorder (not shown) as well as generating a bill in an electronic document form.

Further, although it is proposed in the above described embodiments that the charge computing module 410 computes the "reduced charge", the "reduction contribution charge", the "reduction exclusion charge", and the "generated charge" for each telephony type of the receiver for the telephony communication record of the predetermined duration and the total call charge generated by adding the call charges for respective telephony types together, the present invention is not limited thereto. Alternatively, the embodiments may be implemented such that the charge computing module 410 computes simply only the total call charge or only the call charge for each telephony type.

Furthermore, although it is proposed in the above embodiments that the charge computing module 410 computes the "reduced charge", the "reduction contribution charge", the "reduction exclusion charge", and the "generated charge" for the telephony communication record of the predetermined duration, the present invention is not limited thereto. Alternatively, the embodiments may be implemented such that the charge computing module 410 computes each charge for every telephony communication. When each charge for every telephony communication is computed, it is possible to process every telephony communication as a single telephony communication record by the switching determination modules 12 and 52.

To this end, when telephony communication information is received from the relay apparatus 100 and the initiation of the corresponding telephony communication is detected, the charge computing module 410 operates the timer 420 to check a call time. Further, when the corresponding telephony communication is terminated, the charge computing module 410 computes at least one of the "reduced charge", the "reduction contribution charge", the "reduction exclusion charge", and the "generated charge" automatically or according to a user's instruction.

Specifically, in order to compute the reduced charge or the reduction contribution charge, the charge computing module 410 reads unit charges of the "alternative telephony" and the "basic telephony for each telephony communication type" from the call charge DB 416. Further, while the actual call charge is computed by multiplying a unit charge of the alternative telephony for an actual telephony communication case, the virtual call charge corresponding to the charge before the reduction is computed by multiplying a unit charge of the basic telephony for the same telephony communication case. Furthermore, the reduced charge due to the use of the alternative telephony can be computed by comparing the actual call charge with the virtual call charge based on an assumption that the basic telephony is used.

Further, in order to compute the reduction contribution charge or the generated charge, the charge computing module 410 reads unit charges of the "alternative telephony" and the "basic telephony for each telephony communication type" from the call charge DB 416. Further, while the actual call charge is computed by multiplying a corresponding unit charge for each telephony communication type of the receiver for an actual telephony communication case, a call charge including the reduction is computed by multiplying a unit charge of the "alternative telephony" for the same telephony communication case. Furthermore, the charge additionally generated due to the use of the basic telephony can be computed by comparing the actual call charge with the virtual call charge based on an assumption that the alternative telephony is used.

The "reduced charge", the "reduction contribution charge", the "reduction exclusion charge", and the "generated charge" have been described based on an assumption that only the caller pays the call charge generated due to the telephony communication using the basic telephony. If it is assumed that a receiver side pays a part or all of the call charge, it may be considered that a method of computing the above designated four types of "inverse call charges" and the target to receive the bills are changed according to the assumption.

In a case where the call charge happens to both sides in the telephony communication through the basic telephony network, when the caller using the alternative telephony service performs the telephony communication with the receiver who has not subscribed to the alternative telephony service or has not remained in the alternative telephony reception standby state, a corresponding "inverse call charge" should be calculated based on an assumption that both the generated charge and a charge (hereinafter, referred to as a "non-reduced charge") which is not relatively reduced happen to the receiver, and both the non-reduced charge and the reduction exclusion charge happen to the caller. Further, when the caller who does not use the alternative telephony network performs the telephony communication with the receiver using the alternative telephony network, a corresponding "inverse call charge" should be calculated based on an assumption that both the non-reduced charge and the generated charge happen to the caller, and both the non-reduced charge and the reduction exclusion charge happen to the receiver. Furthermore, when the caller performs the telephony communication with the receiver through the alternative telephony network, a corresponding "inverse call charge" should be calculated based on an assumption that both the reduced charge and the reduction contribution charge happen to the caller, and both the reduced charge and the reduction contribution charge also happen to the receiver.

Fourth Exemplary Embodiment

A fourth exemplary embodiment describes a case where a method and a program for computing the "inverse call charge" are implemented in an "inverse call charge" computing server connected to a telephony terminal of the caller or the receiver.

Figure 12:
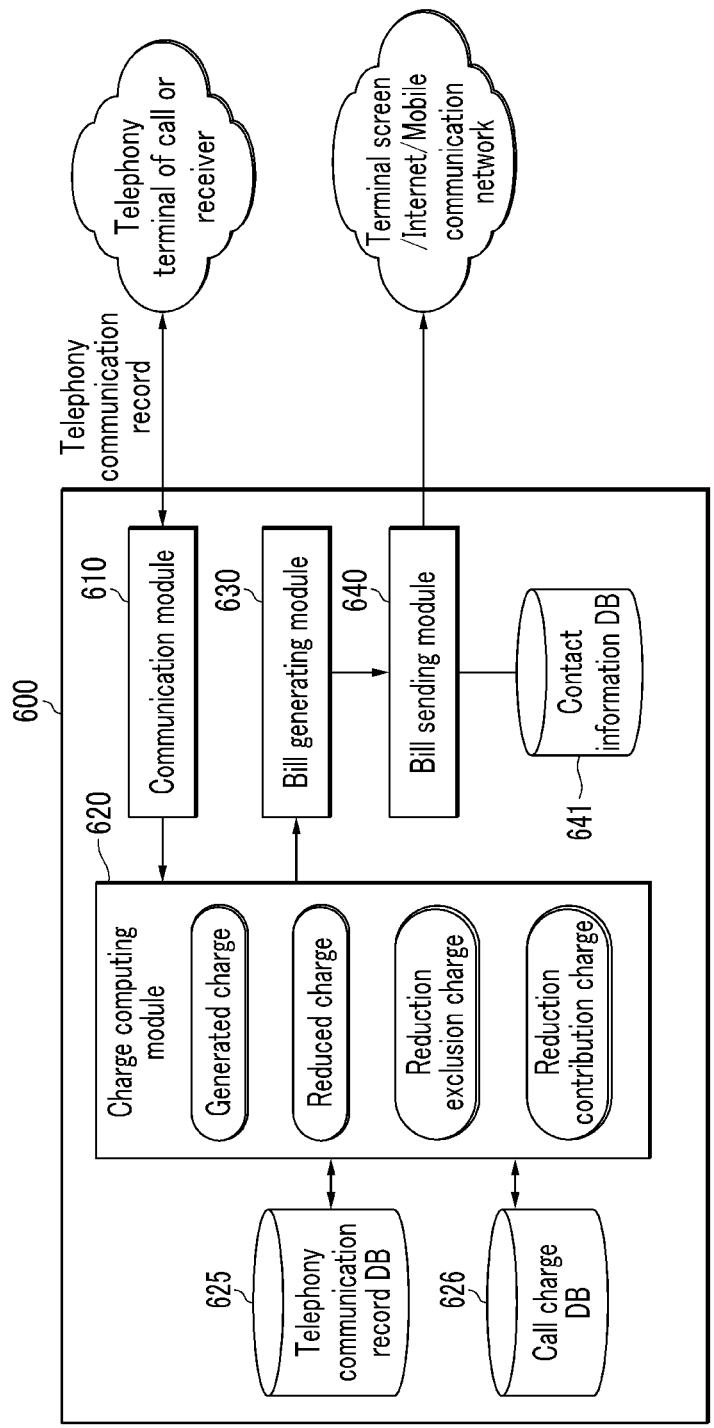
FIG. 12 is a block diagram illustrating each module of a configuration of an inverse call charge computing server of a fourth exemplary embodiment.

FIG. 12 is a block diagram illustrating a configuration of the inverse call charge computing server for each module according to the fourth exemplary embodiment.

An inverse call charge computing server 600 is connected to the telephony terminal of the caller or the receiver through a wire or wirelessly, and is preferable to be connected through an Internet but not necessarily limited to a particular communication regulation.

As shown in FIG. 12, the inverse call charge computing server 600 includes a communication module 610 for performing data communication with the receiver's telephony terminal or the caller's telephony terminal, a charge computing module 620 for computing the inverse call charge, a bill generating module 630 for generating an inverse call charge bill, and a bill sending module 640 for sending a generated bill to a particular caller or a particular receiver.

The communication module 610 receives a telephony communication record from the caller's telephony terminal or the receiver's telephony terminal and store the received telephony communication record in a telephony communication record DB 625 whenever the telephony communication between the caller and the receiver is terminated.

The telephony communication record includes caller information, receiver information, a telephony communication type, and a call time. The caller information may include at least one of a name, a phone number, and an alternative telephony service ID of the caller, and the receiver information may include at least one of a name, a phone number, and an alternative telephony service ID of the receiver.

As for the telephony communication type, it is designated whether the corresponding telephony communication is basic telephony communication or alternative telephony communication. Here, the basic telephony communication can be divided into a wire telephony, a mobile telephony, an international telephony, a long-distance telephony and the like to be designated.

The charge computing module 620 computes at least one of the "reduced charge", the "reduction contribution charge", the "reduction exclusion charge", and the "generated charge" which are inverse call charges when a preset due date or period arrives or a direct instruction is provided by a user. Since definitions of the inverse call charges and an inverse call charge computing algorithm are the same as those of the third exemplary embodiment, repeated descriptions including a call charge DB 626 will be omitted.

However, only a difference from the third exemplary embodiment is that the charge computing module 410 receives telephony communication information from the switching determination modules 12 and 52 and executes the timer by determining the initiation and the termination of the telephony communication by itself, but the charge computing module 620 of the inverse call charge server 600 in the fourth exemplary embodiment purely computes only the inverse call charge by using a telephony communication record provided from an external caller's telephony terminal or receiver's telephony terminal for checking a call time according to the initiation and the termination of the telephony communication, inserting information on the call time in the telephony communication record, and providing the telephony communication record to the inverse call charge server 600.

The bill generating module 630 and the bill sending module 640 also generate and send an inverse call charge bill through the same process as that of the bill generating module 430 and the bill sending module 440 of the third exemplary embodiment. Accordingly, repeated descriptions in connection with the bill generating module 630, the bill sending module 640, and a contact information DB 641 will be omitted.

Fifth Exemplary Embodiment

A fifth exemplary embodiment is equal to the third exemplary embodiment in that a method and a program for computing the inverse call charge are implemented in the telephony terminal of the caller or the receiver, but a configuration of the technology for switching between the alternative telephony and the basic telephony is excluded from the fifth exemplary embodiment unlike the third exemplary embodiment.

Figure 13:
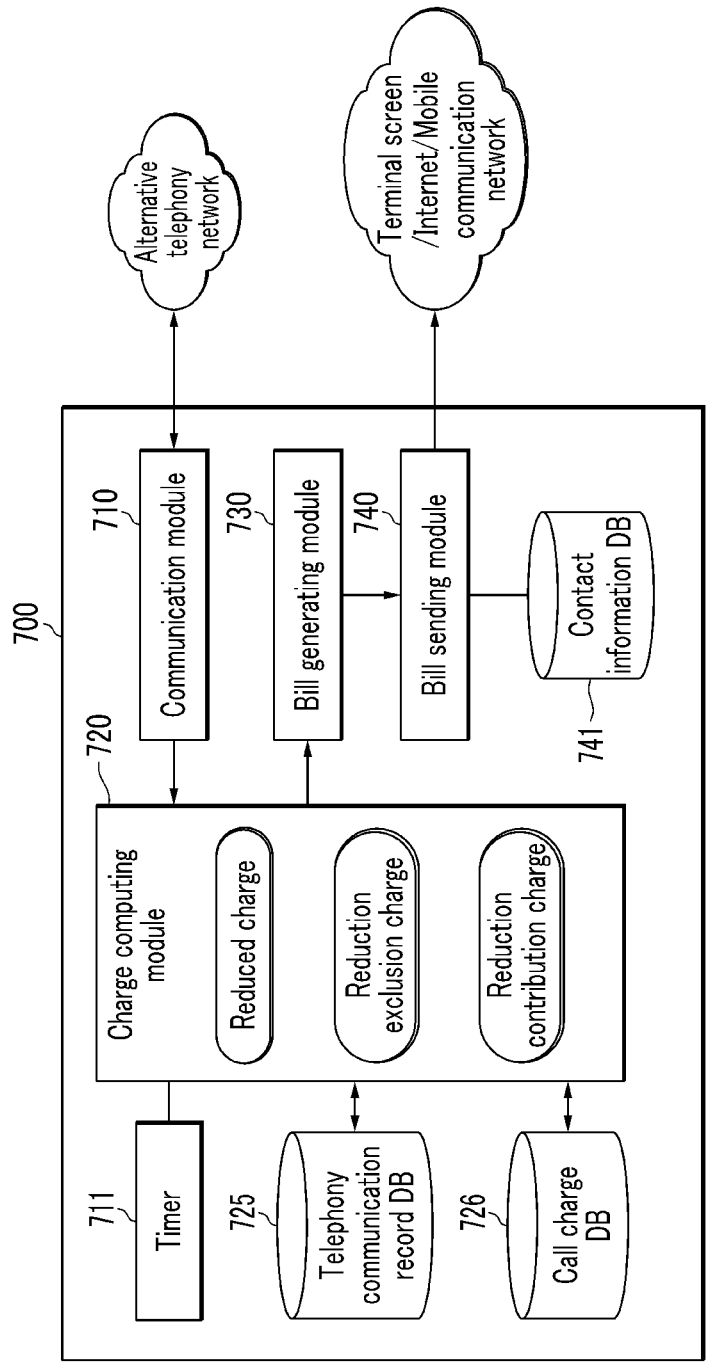
FIG. 13 is a block diagram illustrating each module of a configuration of an inverse call charge computing program executed in a telephony terminal of a caller or a receiver for a fifth exemplary embodiment.

FIG. 13 is a block diagram for each module illustrating a configuration of a telephony terminal implementing the method of computing the inverse call charge of the fifth exemplary embodiment.

As shown in FIG. 13, a telephony terminal 700 includes a communication module 710 for performing alternative telephony communication with a counterpart telephony terminal, a charge computing module 720 for computing the inverse call charge, a bill generating module 730 for generating an inverse call charge bill, and a bill sending module 740 for sending the generated bill to the bill sending module 740, a particular caller, or a particular receiver.

The communication module 710 operates a timer 711 to check a call time when the telephony communication with a counterpart is initiated, and stores a telephony communication record of the corresponding telephony communication in a telephony communication record DB 725 when the telephony communication is terminated. The telephony communication record has been described in the fourth exemplary embodiment.

The charge computing module 720 computes at least one of the "reduced charge", the "reduction contribution charge", and the "reduction exclusion charge" which are inverse call when a preset due date or period arrives or a direct instruction is provided by a user. Since definitions of the inverse call charges and an inverse call charge computing algorithm are the same as those of the third exemplary embodiment, repeated descriptions including a call charge DB 726 will be omitted.

The bill generating module 730 and the bill sending module 740 also generate and send an inverse call charge bill through the same process as that of the bill generating module 430 and the bill sending module 440 of the third exemplary embodiment. Accordingly, repeated descriptions in connection with the bill generating module 730, the bill sending module 740, and a contact information DB 741 will be described.

The inverse call charges are classified into the "reduced charge", the "generated charge", the "reduction exclusion charge", and the "reduction contribution charge", and detailed methods of computing them have been described in the above proposed exemplary embodiments, The present invention is not limited to the proposed computing order and method, and may use another mathematic computing method which can draw such a result.

Further, the method of computing each of the inverse call charges can be applied to another alternative telephony network having a different configuration system from that described in the present invention. When telephony communication is successfully performed only using the alternative telephony, a "reduced charge" and a "reduction contribution charge" corresponding to a particular receiver and a particular caller can be accurately computed. Furthermore, virtual "reduced charge", "reduction contribution charge", "reduction exclusion charge", "generated charge" and the like can be computed by assuming a virtual telephony communication pattern of a basic telephony user without the dependence on an accurate telephony communication record. Through notifying the inverse call charges in such a form, it is possible to induce the user to subscribe to a particular alternative telephony communication or induce to maintain a telephony communication reception state after the subscription.

While the exemplary embodiments of the present invention have been described in detail, it will be understood that the scope of the present invention is not limited thereto and various modifications and changes, by those skilled in the art, using a basic concept of the present invention are included in the claim of the present invention. Particularly, the implementation of the methods proposed by the present invention through software is also included in the scope of the present invention.

DESCRIPTION OF SYMBOLS 100, 500: Telephony terminal of caller
210: Member management server
220: Alternative network switching device
310: Internet phone of incoming side
320: Mobile phone of incoming side 330: Wire phone of incoming side
10, 50: Programs for switching originating call and computing inverse call charge
11, 51: Alternative telephony communication module
12, 52: Switching determination module
13, 53: Basic telephony communication module
410: Charge computing module 420: Timer
430: Bill generating module

What is claimed is:

1. A method of computing an inverse call charge for a telephony communication via a telecommunication system, the method comprising:

sending a call connection request including information on a receiver to an alternative telephony communication module of an alternative telephony communication network by a switching determination module of a telephony terminal of a caller, wherein the telecommunication system comprising the alternative telephony communication network and a basic telephony network;

determining whether the alternative telephony communication module receives a notice informing that the receiver is not an alternative telephony service subscriber or the receiver is not in an alternative telephony reception standby state from the alternative telephony network in response to the call connection request, and thereafter switching the call connection request to a basic telephony communication module associated with the basic telephony network by the switching determination module;

establish a telephony communication for the call connection request using one of the alternative telephony communication network and a basic telephony network based on said determining step;

after telephony communication by the call connection is terminated, calculating by a charge computing module:
i) an actually call charge using the call time of the telephony communication and a call rate for the telephony communication network used to perform said call connection, and ii) a virtual call charge using the call time of the telephony communication and a call rate for the other telephony communication network;

and ii) computing an inverse call charge comprising the difference in value between the actual call charge and the virtual call charge;

generating a bill including the inverse call charge by a bill generating module by applying the actually call charge, the virtual call charge and the inverse call charge to a predetermine template, wherein the inverse call charge indicates the amount should be paid additionally if the basic telephony network is used.

2. The method of claim 1, wherein the information on the receiver is at least one of an alternative telephony service ID, a phone number, a resident registration number, an e-mail address, and a social network ID of the receiver.

3. The method of claim 1, wherein
the inverse call charge is a reduced charge corresponding to a relatively saved charge paid by a caller due to telephony communication using the alternative telephony in comparison with telephony communication using the basic telephony.

4. The method of claim 1, wherein
the inverse call charge is a reduction contribution charge corresponding to a charge contributing to reduce a call charge paid by a caller due to telephony communication using the alternative telephony performed with a caller by a particular receiver in comparison with a basic telephony call charge.

5. The method of claim 1, wherein
the inverse call charge is a generated charge corresponding to a charge paid more than an alternative telephony call charge by the caller due to telephony communication using the basic telephony between a particular receiver who does not remain in the alternative telephony reception standby state and a caller using the alternative telephony.

6. The method of claim 1, wherein
when a counterpart calls through the basic telephony communication module,
the inverse call charge is a reduction exclusion charge corresponding to a charge paid more than an alternative telephony call charge due to telephony communication using the basic telephony between a particular caller who has not subscribed to an alternative telephony service and a receiver who remains in the alternative telephony reception standby state.

7. The method of claim 1, wherein
the bill is sent through at least one of an e-mail, a messaging service, and a web post.

8. The method of claim 7, wherein the bill is sent via the e-mail.

9. The method of claim 7, wherein the bill is sent via the messaging service.

10. The method of claim 1, further comprising:
sending the generated inverse call charge bill to the caller.

* * * * *